(12) United States Patent
Back et al.

(10) Patent No.: US 12,302,445 B2
(45) Date of Patent: May 13, 2025

(54) METHOD FOR SIDELINK DRX-RELATED OPERATION OF UE IN WIRELESS COMMUNICATION SYSTEM

(71) Applicant: LG ELECTRONICS INC., Seoul (KR)

(72) Inventors: Seoyoung Back, Seoul (KR); Giwon Park, Seoul (KR); Seungmin Lee, Seoul (KR); Jongyoul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 348 days.

(21) Appl. No.: 17/904,018

(22) PCT Filed: Feb. 15, 2021

(86) PCT No.: PCT/KR2021/001885
§ 371 (c)(1),
(2) Date: Aug. 11, 2022

(87) PCT Pub. No.: WO2021/162511
PCT Pub. Date: Aug. 19, 2021

(65) Prior Publication Data
US 2023/0095483 A1    Mar. 30, 2023

(30) Foreign Application Priority Data
Feb. 11, 2020 (KR) .................. 10-2020-0016148

(51) Int. Cl.
*H04W 76/28* (2018.01)
*H04W 52/02* (2009.01)

(52) U.S. Cl.
CPC ....... *H04W 76/28* (2018.02); *H04W 52/0229* (2013.01)

(58) Field of Classification Search
None
See application file for complete search history.

(56) References Cited

U.S. PATENT DOCUMENTS 10,390,305 B1 * 8/2019 Geekie ............... H04W 52/0293
10,841,158 B1 * 11/2020 Amos ................. H04L 41/0816
(Continued)

FOREIGN PATENT DOCUMENTS

KR    10-2019-0039101    4/2019
WO    2018-064477    4/2018

OTHER PUBLICATIONS

PCT International Application No. PCT/KR2021/001885, International Search Report dated Jun. 10, 2021, 3 pages.
(Continued)

*Primary Examiner* — Minh Trang T Nguyen
(74) *Attorney, Agent, or Firm* — LEE, HONG, DEGERMAN, KANG & WAIMEY

(57) ABSTRACT

An embodiment relates to a method for a sidelink discontinuous reception (DRX)-related operation of a second user equipment (UE) in a wireless communication system, the method comprising: a step in which a second UE enters a sleep state; and a step in which the second UE switches to an awake state in a predetermined interval and receives a broadcast signal from a first UE, wherein the broadcast signal is received on a resource pool configured only for a sidelink broadcast.

10 Claims, 24 Drawing Sheets

(56) References Cited

U.S. PATENT DOCUMENTS

| | | | | |
|---|---|---|---|---|
| 2014/0071870 A1* | 3/2014 | Abraham | .......... | H04W 52/0206 |
| | | | | 370/311 |
| 2017/0208516 A1 | 7/2017 | Kubota et al. | | |
| 2017/0317681 A1* | 11/2017 | Liu | .................. | H04W 76/28 |
| 2020/0092685 A1* | 3/2020 | Fehrenbach | ........ | H04W 84/005 |

OTHER PUBLICATIONS

Vivo, "Support of NR Uu controlling LTE sidelink," R1-1912028, 3GPP TSG RAN WG1 Meeting #99, Nov. 2019, 10 pages.

Sony, "Discussion on sidelink resource allocation and configuration," R1-1712982, 3GPP TSG RAN WG1 Meeting #90, Aug. 2017, 6 pages.

\* cited by examiner (a)

(b)

(a)

(b)

METHOD FOR SIDELINK DRX-RELATED OPERATION OF UE IN WIRELESS COMMUNICATION SYSTEM

CROSS-REFERENCE TO RELATED APPLICATION(S)

This application is the National Stage filing under 35 U.S.C. 371 of International Application No. PCT/KR2021/001885, filed on Feb. 15, 2021, which claims the benefit of earlier filing date and right of priority to Korean Application No. 10-2020-0016148, filed on Feb. 11, 2020, the contents of which are all hereby incorporated by reference herein in their entireties.

TECHNICAL FIELD

The following description relates to a wireless communication system, and more particularly to a sidelink discontinuous reception (DRX)-related operation method and apparatus.

BACKGROUND ART

Wireless communication systems are being widely deployed to provide various types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eIBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

DISCLOSURE

Technical Problem

An object of embodiment(s) is to provide a configuration in which a broadcast message uses an exclusive resource pool in sidelink DRX and methods for aligning on-duration of sidelink UEs.

Technical Solution

According to an embodiment, a sidelink discontinuous reception (DRX)-related operation method of a second user equipment (UE) in a wireless communication system includes entering, by the second UE, a sleep state, and the second UE transitioning to an awake state and receiving a broadcast signal from a first UE in a predetermined period, wherein the broadcast signal is received on a dedicated resource pool for sidelink broadcast.

According to an embodiment, a second user equipment (UE) in a wireless communication system includes at least one processor; and at least one computer memory operatively connected to the at least one processor and configured to store commands for causing the at least one processor to perform operations when being executed, wherein the operations includes entering a sleep state, and transitioning to an awake state and receiving a broadcast signal from a first UE in a predetermined period, wherein the broadcast signal is received on a dedicated resource pool for sidelink broadcast.

According to an embodiment, a processor for performing operations for a second user equipment (UE) in a wireless communication system includes entering a sleep state, and transitioning to an awake state and receiving a broadcast signal from a first UE in a predetermined period, wherein the broadcast signal is received on a dedicated resource pool for sidelink broadcast.

An embodiment provides a non-volatile computer readable storage medium for storing at least one computer program including a command for causing at least one processor to perform operations for a second user equipment (UE) when being executed by the at least one processor, the operations including entering a sleep state, and transitioning to an awake state and receiving a broadcast signal from a first UE in a predetermined period, wherein the broadcast signal is received on a dedicated resource pool for sidelink broadcast.

The predetermined period may be determined by a base station (BS) based on one or more of a Message type, Required coverage, Required latency, service characteristics, geographical area, Group ID(s), and triggering indication.

The predetermined period may be determined by the BS that receives a broadcast resource request of the first UE.

The broadcast resource request may include one or more of the Message type, the Required coverage, the Required latency, the service characteristics, the geographical area, the Group ID(s), and the triggering indication.

The predetermined period may be for a UE having a common sidelink DRX configuration with the second UE.

The predetermined period may be different from a period configured for a UE that does not have the common sidelink DRX configuration with the second UE.

The common sidelink DRX configuration may be different according to at least one of a service, a geographical-area, a zone ID, or a group ID.

The predetermined period may be indicated by DCI received during on-duration related to a BS by the second UE.

The predetermined period may be determined by the BS based on one or more of latency requirement, delay budget, and Uu DRX on-duration of UEs that receive the broadcast signal.

On-duration related to the BS may be on-duration of Uu DRX.

The dedicated resource pool for sidelink broadcast may be differently configured for each cell.

Advantageous Effects

An embodiment may overcome a problem in which it is difficult to transfer a broadcast message since on-durations are not aligned between sidelink UEs due to a DRX configuration for each service, etc.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

BEST MODE

In various embodiments of the present disclosure, "/" and "," should be interpreted as "and/or". For example, "A/B"

may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, $5^{th}$ generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
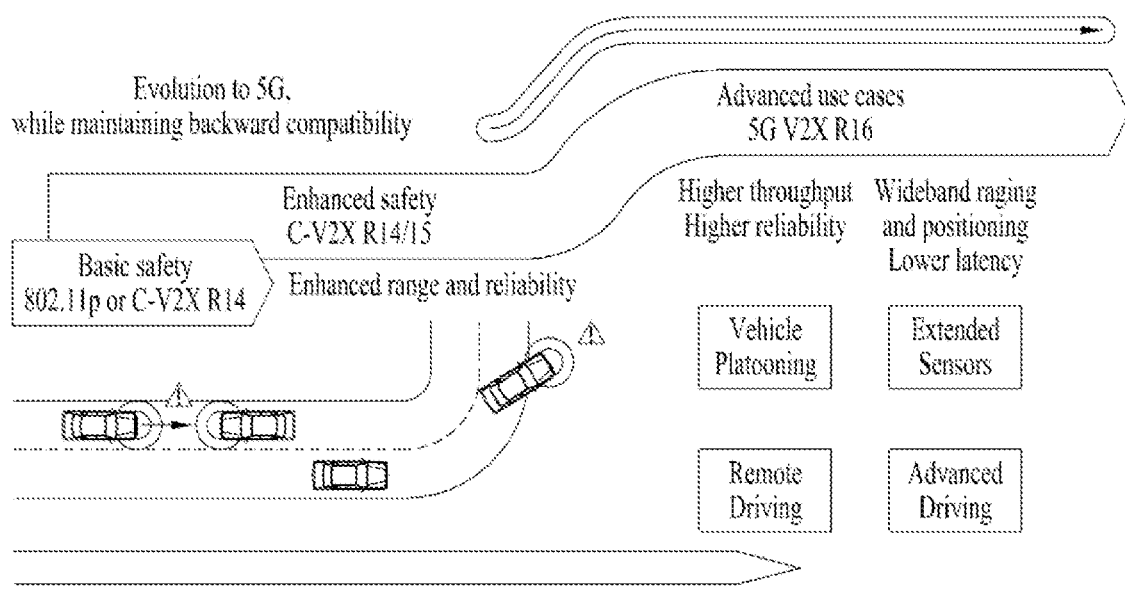
FIG. 1 is a diagram comparing vehicle-to-everything (V2X) communication based on pre-new radio access technology (pre-NR) with V2X communication based on NR.
Figure 2:
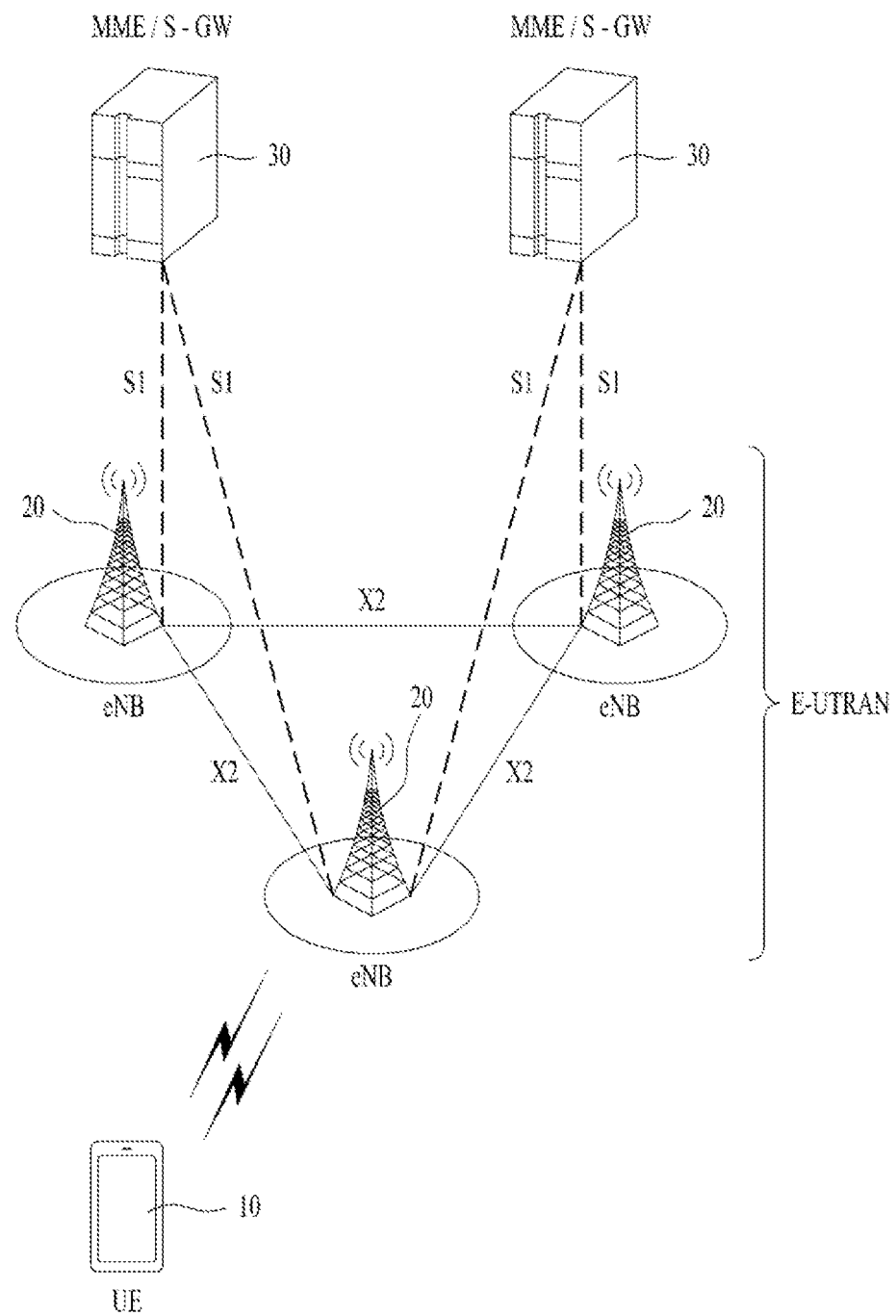
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
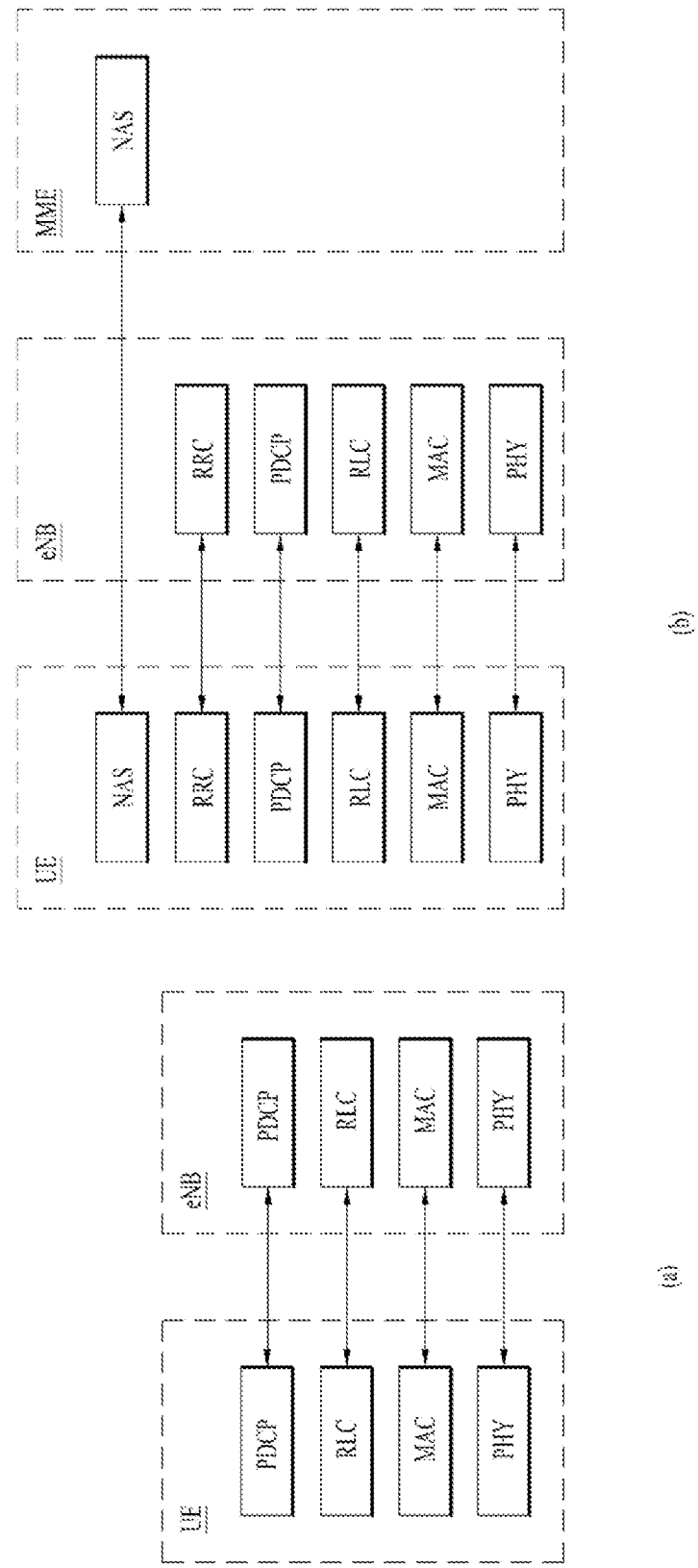
FIG. 3 is a diagram illustrating user-plane and control-plane radio protocol architectures according to an embodiment of the present disclosure.

FIG. 3(a) illustrates a user-plane radio protocol architecture according to an embodiment of the disclosure.

FIG. 3(b) illustrates a control-plane radio protocol architecture according to an embodiment of the disclosure. A user plane is a protocol stack for user data transmission, and a control plane is a protocol stack for control signal transmission.

Referring to FIGS. 3(a) and 3(b), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB).

The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
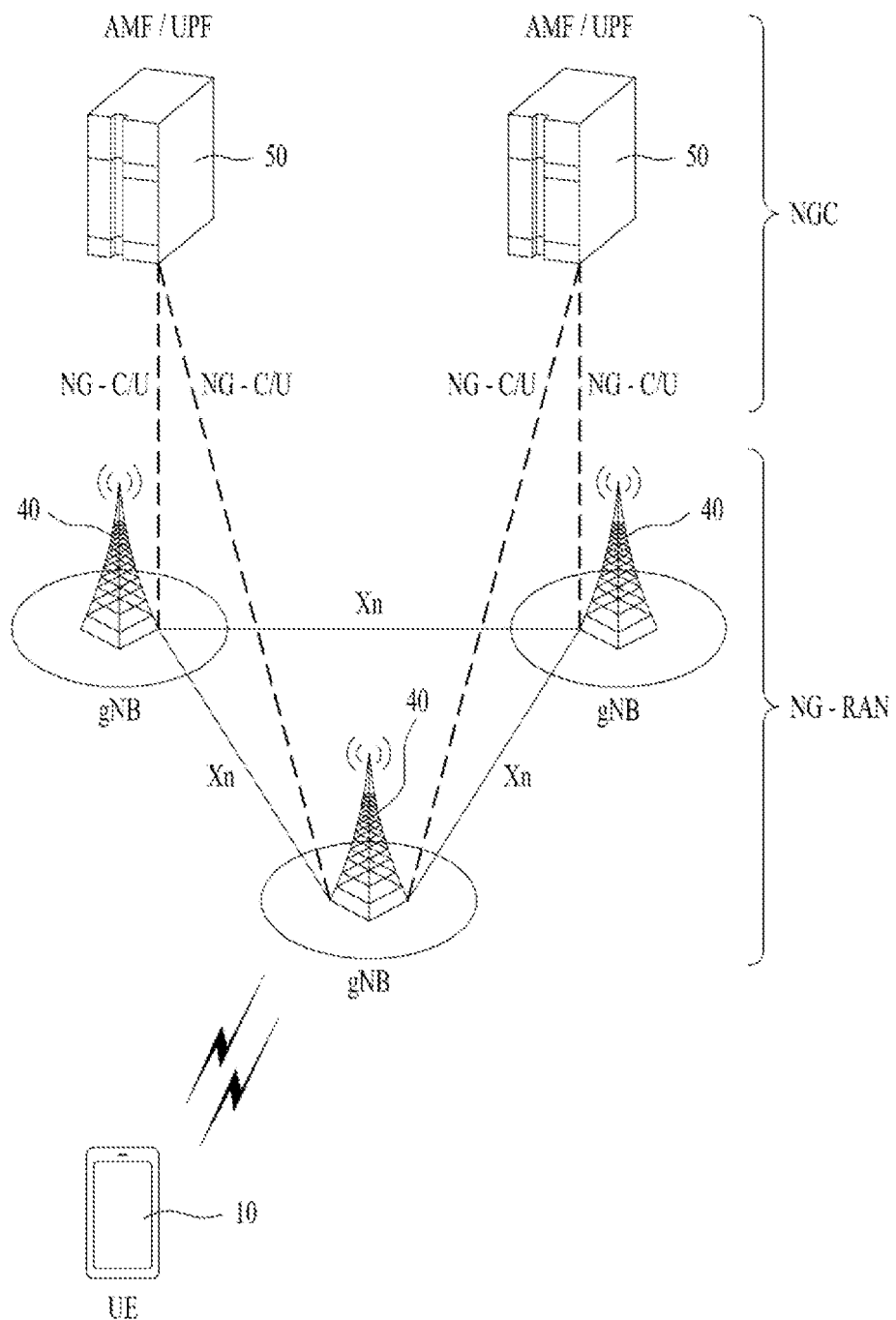
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
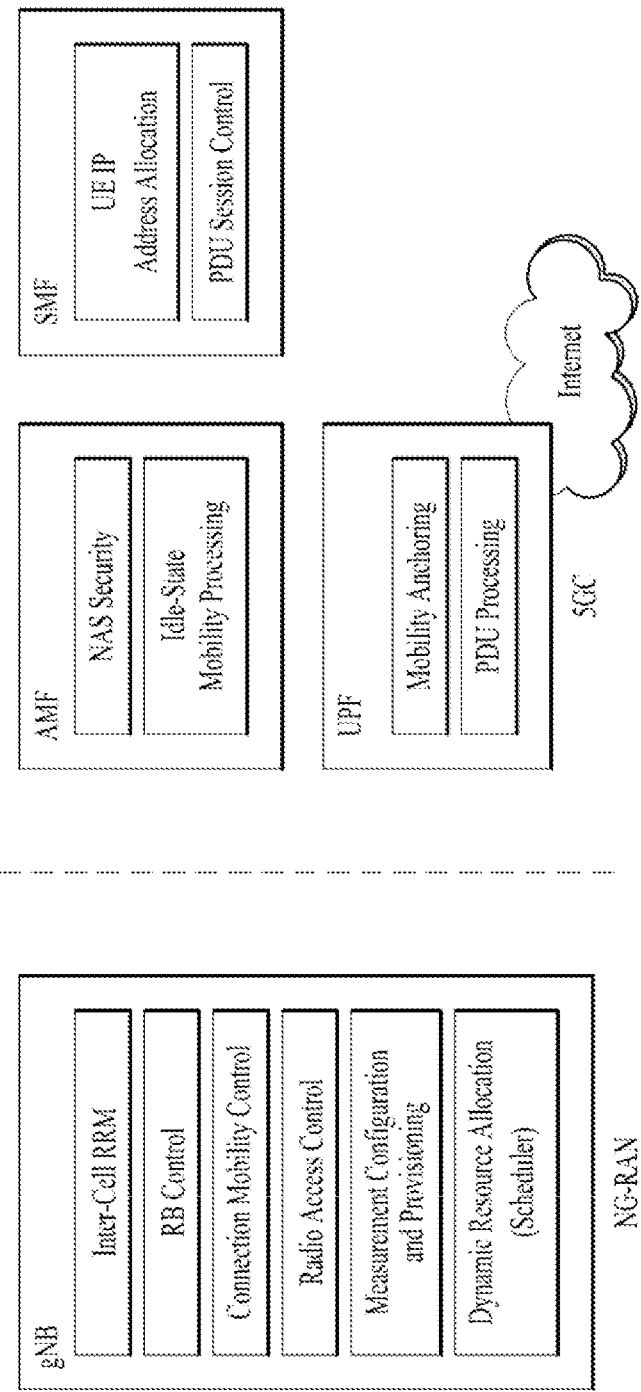
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
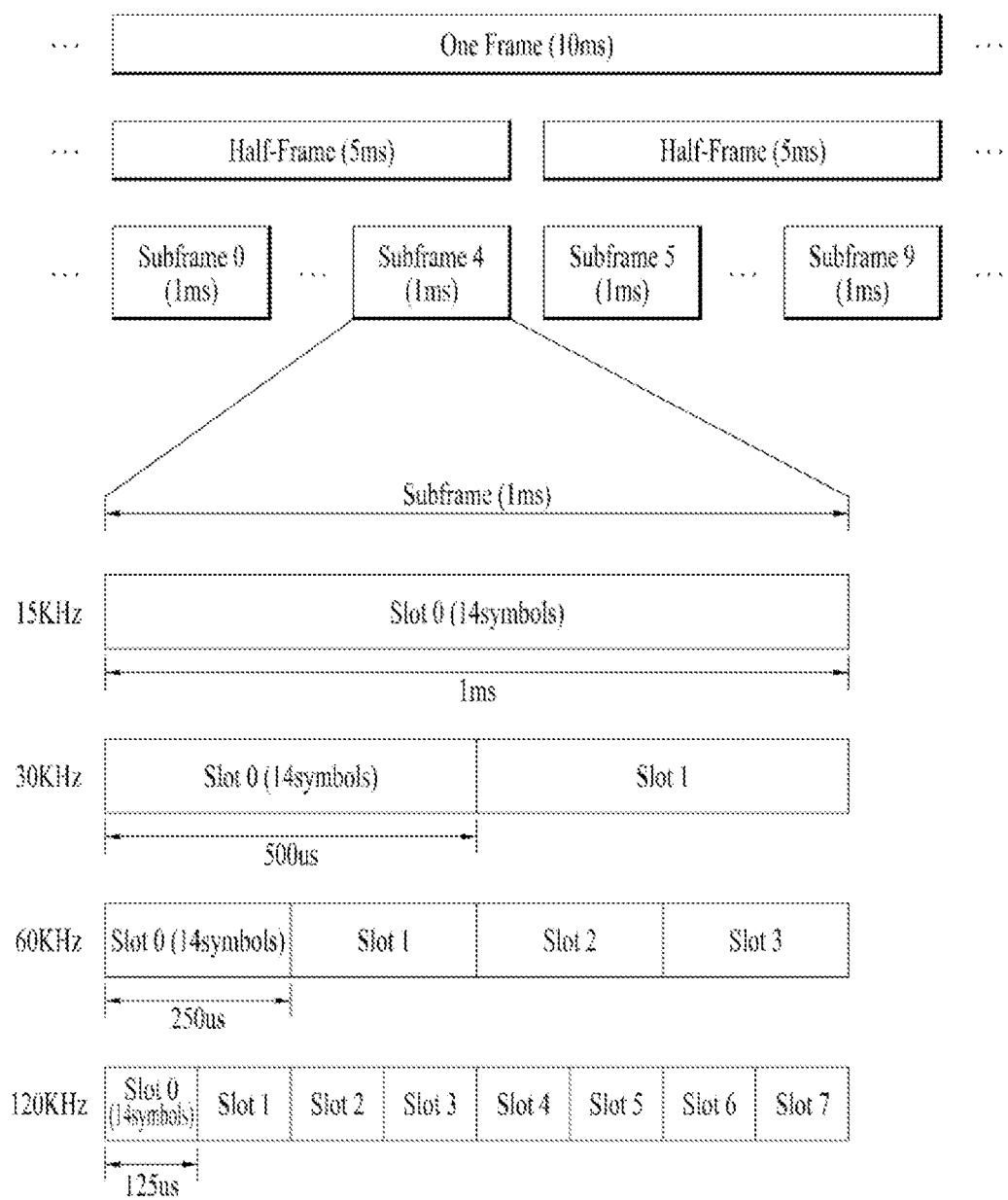
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration in the NCP case.

TABLE 1

| SCS (15 * 2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2?u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in Table 3. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in Table 4. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 7:
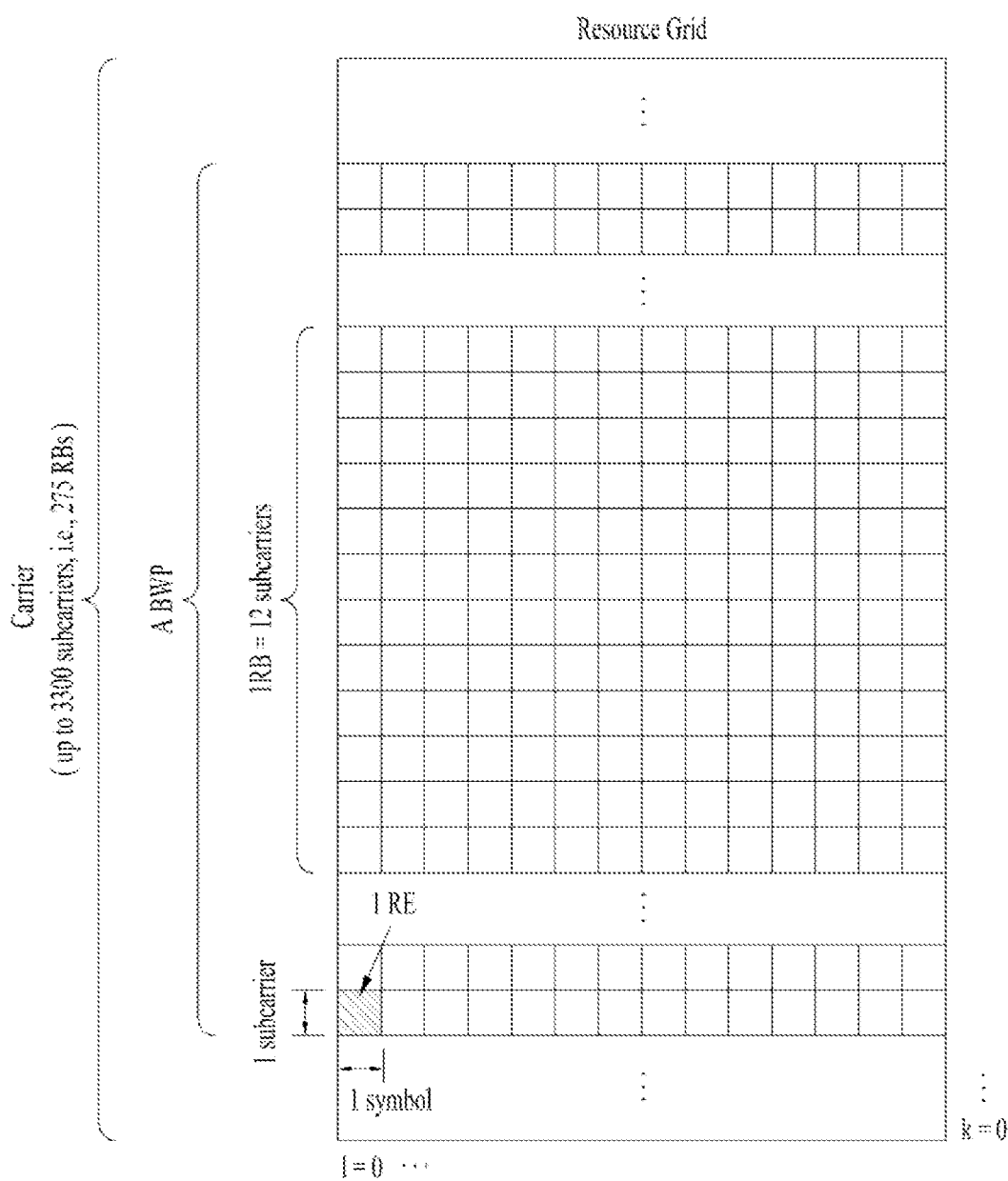
FIG. 7 is a diagram illustrating a slot structure of an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8:
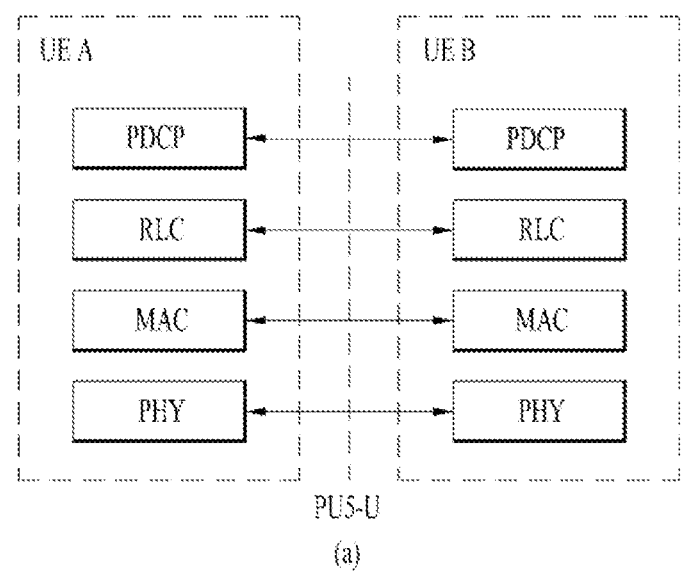
FIG. 8 is a diagram illustrating radio protocol architectures for sidelink (SL) communication according to an embodiment of the present disclosure.
Figure 8:
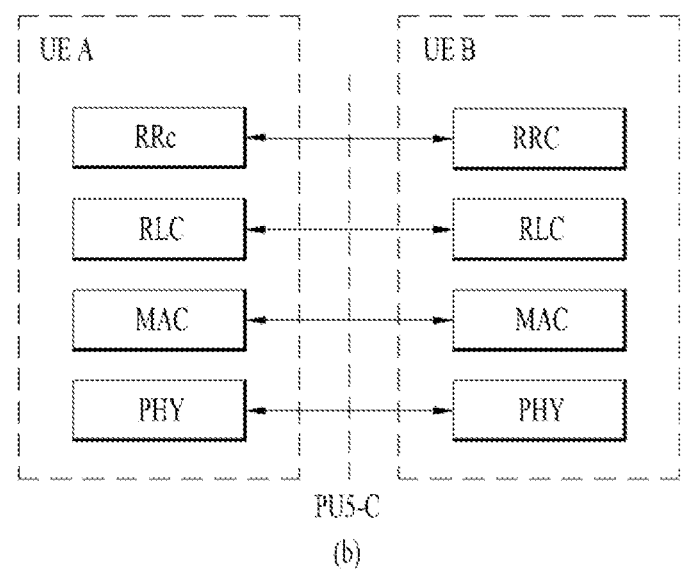

FIG. 8 illustrates a radio protocol architecture for SL communication according to an embodiment of the present disclosure. Specifically, FIG. 8(a) illustrates a user-plane protocol stack in LTE, and FIG. 8(b) illustrates a control-plane protocol stack in LTE.

Figure 9:
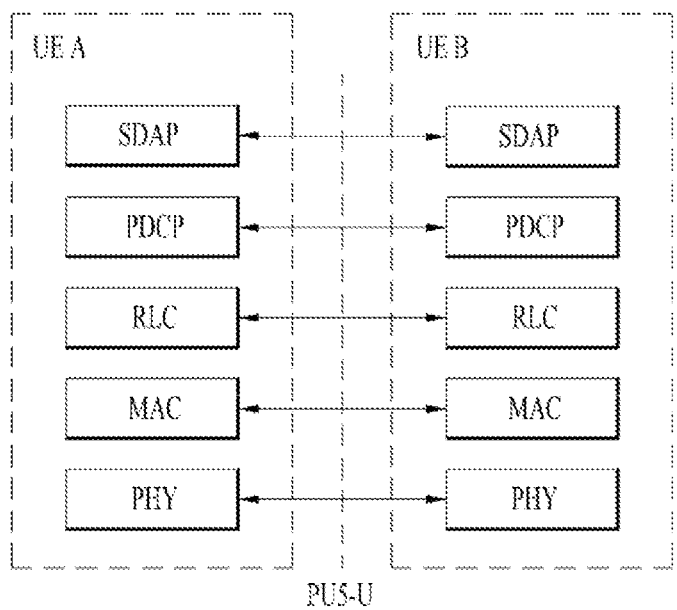
FIG. 9 is a diagram illustrating radio protocol architectures for SL communication according to an embodiment of the present disclosure.
Figure 9:
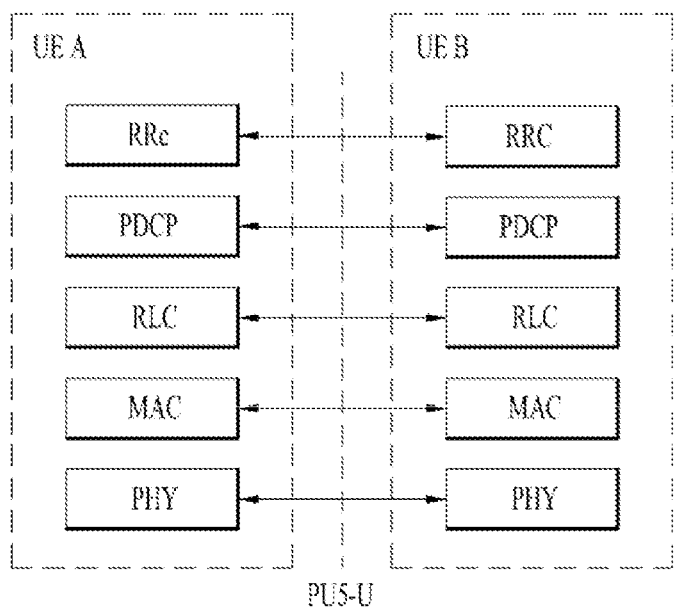

FIG. 9 illustrates a radio protocol architecture for SL communication according to an embodiment of the present disclosure. Specifically, FIG. 9(a) illustrates a user-plane protocol stack in NR, and FIG. 9(b) illustrates a control-plane protocol stack in NR.

Resource allocation in SL will be described below.

Figure 10:
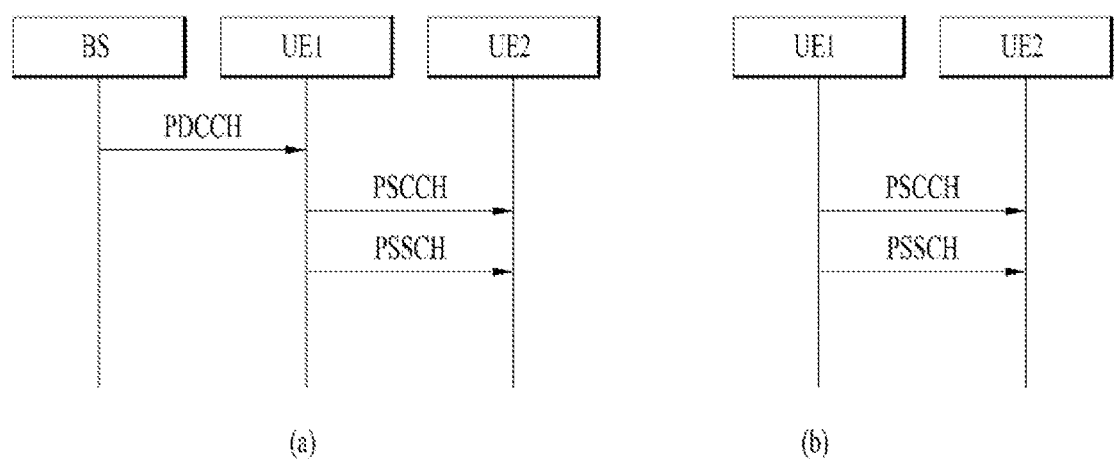
FIG. 10 illustrates a procedure in which a UE performs V2X or SL communication according to a transmission mode according to an embodiment of the present disclosure.

FIG. 10 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 10(a) illustrates a UE operation related to LTE transmission mode 1 or LTE transmission mode 3. Alternatively, for example, FIG. 10(a) illustrates a UE operation related to NR resource allocation mode 1. For example, LTE transmission mode 1 may be applied to general SL communication, and LTE transmission mode 3 may be applied to V2X communication.

For example, FIG. 10(b) illustrates a UE operation related to LTE transmission mode 2 or LTE transmission mode 4. Alternatively, for example, FIG. 10(b) illustrates a UE operation related to NR resource allocation mode 2.

Referring to FIG. 10(a), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every Xms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 10(b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SC. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or an SL channel state information (CSI) report request indicator or SL (L1) RSRP (and/or SL (L1) reference signal received quality (RSRQ) and/or SL (L1) received signal strength indicator (RSSI)) report request indicator, and/or an SL CSI transmission indicator (on PSSCH) (or SL (L1) RSRP (and/or SL (L1) RSRQ and/or SL (L1) RSSI) information transmission indicator), and/or MCS information, and/or transmission power information, and/or L1 destination ID information and/or L1 source ID information, and/or SL HARQ process ID information, and/or new data indicator (NDI) information, and/or redundancy version (RV) information, and/or QoS information (related to transmission traffic/packet), for example, priority information, and/or an SL CSI-RS transmission indicator or information about the number of SL CSI-RS antenna ports (to be transmitted);

location information about a transmitting UE or location (or distance area) information about a target receiving UE (requested to transmit an SL HARQ feedback), and/or RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Hereinafter, discontinuous reception (DRX) as one of schemes for realizing UE power saving will be described.

A procedure of a DRX-related UE may be summarized as shown in Table 5 below.

TABLE 5

| | Type of signals | UE procedure |
|---|---|---|
| Step 1 | RRC signaling (MAC-CellGroupConfig) | Receive DRX configuration information |
| Step 2 | MAC CE (Long) DRX command MAC CE | Receive DRX command |
| Step 3 | | PDCCH monitoring during on-duration of DRX period |

Figure 11:
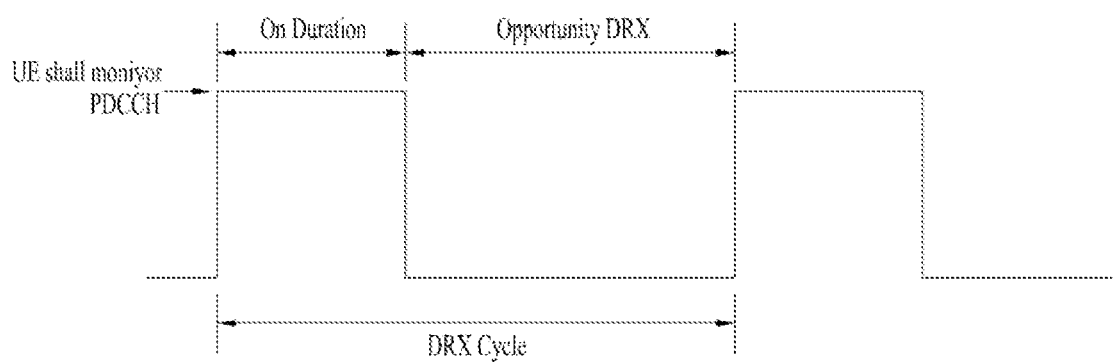
FIGS. 11 to 17 are diagrams for explaining embodiment(s)

FIG. 11 is a diagram showing an example of a DRX period to which the present disclosure is applicable.

Referring to FIG. 11, a UE may use DRX in an RRC_IDLE state and an RRC_INACTIVE state in order to reduce power consumption. When DRX is configured, the UE may perform a DRX operation according to DRX configuration information. The UE performing DRX may repeatedly turn on and off a reception operation.

For example, when DRX is configured, the UE may attempt to receive a PDCCH as a DL channel only within a preconfigured time zone and may not attempt to receive the PDCCH within the remaining time zone. The time zone in which the UE attempts to receive the PDCCH may be referred to as on-duration, and the on-duration zone may be defined once per DRX cycle.

The UE may receive the DRX configuration information from a gNB via RRC signaling and may perform DRX via reception of long DRX command MAC CE.

The DRX configuration information may be included in MAC-CellGroupConfig. MAC-CellGroupConfig as an IE may be used to configure MAC parameters for a cell group including DRX.

The DRX command MAC CE or the long DRX command MAC CE may be identified by a MAC PDU subheader having an LCID. This may have a fixed size of 0 bit.

Table 6 below shows an example of an LCID of DL-SCH.

TABLE 6

| Index | LCID values |
|---|---|
| 111011 | Long DRX Command |
| 111100 | DRX Command |

A PDCCH monitoring operation of the UE may be controlled by DRX and bandwidth adaptation (BA). When DRX is configured, the UE may not need to continuously perform PDCCH monitoring. The DRX may have the following features.

On-duration: This may be a time zone in which the UE is on standby to receive a PDCCH after waking up. When the UE successfully decodes the PDCCH, the UE may maintain a waking state and may start an inactivity-timer.

Inactivity-timer: This may be a time zone in which the UE is on standby to successfully decode a PDCCH from the last successful PDCCH decoding and sleeps again in the case of failure. The UE needs to restart an inactivity-timer after a single successful decoding of the PDCCH for the only first transmission (i.e., not for retransmission).

Retransmission timer: This may be a time zone in which retransmission is expected.

Cycle: This may define periodic repetition of on-duration and subsequent possible inactive cycles.

Hereinafter, DRX in a MAC layer will be described. Hereinafter, a MAC entity may be expressed as a UE or a MAC entity of the UE.

The MAC entity may be configured via RRC having a DRX function for controlling a PDCCH monitoring activity of the UE with respect to C-RNTI, CS-RNTI, TPC-PUCCH-RNTI, TPC-PUSCH-RNTI, and TPC-SRS-RNTI of the MAC entity. When a DRX operation is used, the MAC entity needs to monitor a PDCCH. In the RRC_CONNECTED state, when DRX is configured, the MAC entity may discontinuously monitor the PDCCH using the DRX operation. Otherwise, the MAC entity needs to continuously monitor the PDCCH.

The RRC may control the DRX operation by configuring parameters of the DRX configuration information.

When a DRX cycle is configured, an active time may include the following time.

time in which drx-onDurationTimer, drx-InactivityTimer, drx-RetransmissionTimerDL, drx-RetransmissionTimerUL, or ra-ContentionResolutionTimer is currently operated;

time in which a scheduling request is transmitted on a PUCCH and is pending; or time in which a PDCCH indicating new transmission to C-RNTI of the MAC entity is not received after successful reception of a random access response to a random access preamble that is not selected by the MAC entity among contention-based random access preambles.

Hereinafter, DRX for paging will be described.

The UE may use DRX in an RRC_IDLE state and an RRC_INACTIVE state in order to reduce power consumption. The UE may monitor one paging occasion (PO) per DRX cycle, and one PO may include a plurality of time slots (e.g., sub-frame or OFDM symbol) for transmitting paging DCI. In a multi-beam operation, the length of one PO may be one cycle of beam sweeping, and the UE may assume that the same paging message is repeated in all beams of a sweeping pattern. The paging message may be the same in paging initiated by RAN and paging initiated by CN.

One paging frame (PF) may be one radio frame and may include one or more POs.

The UE may initiate an RRC connection restart procedure when receiving RAN paging. When receiving paging initiated by the CN in the RRC_INACTIVE state, the UE may transition to the RRC_IDLE state and may notify the NAS of this.

Figure 12:
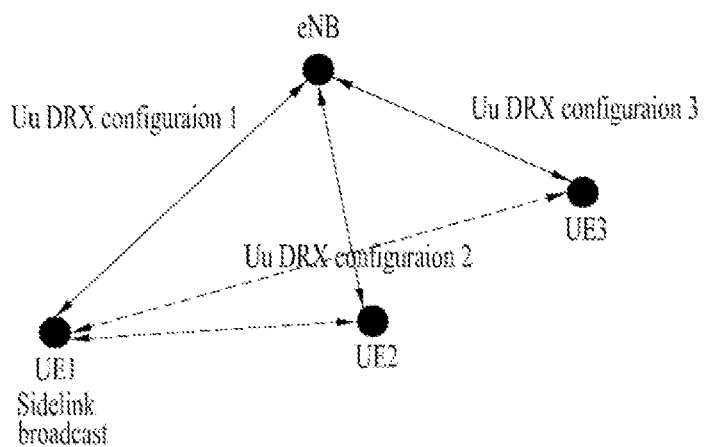

In Rel-16 V2X Sidelink Communication, a power saving operation (Discontinuous Reception (DRX)) of the UE may not be supported. In order to receive information broadcast by a specific UE in an environment configured with different sidelink DRX configurations, there is a need for a transmission or reception method therefor. That is, like in FIG. 12, in an environment in which a DRX configuration is configured UE-specifically, a sidelink DRX pattern may have a configuration in which on-duration is to be generated to be a part of a Uu DRX pattern or to be adjacent to thereto. For example, when a UE (UE1 of FIG. 12) operating in a DRX mode having a specific configuration sidelilnk-broadcasts broadcast information to adjacent UE(s) (UE2 and UE3 of the following diagram) operating in a DRX mode with a different configuration, there is a need for a method of receiving this. The drawing shows an operation in in-coverage, and here, a solid line indicates a Uu link interface, and a dotted line indicates a sidelink interface.

Figure 13:
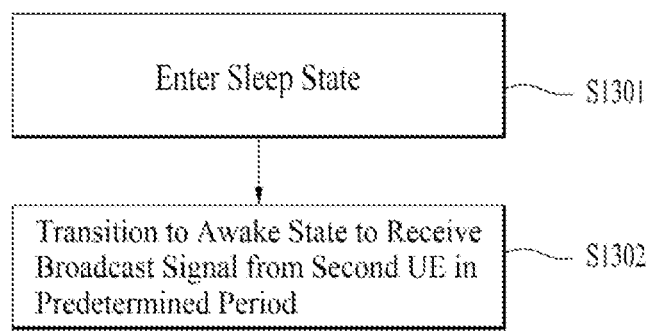
Figure 14:
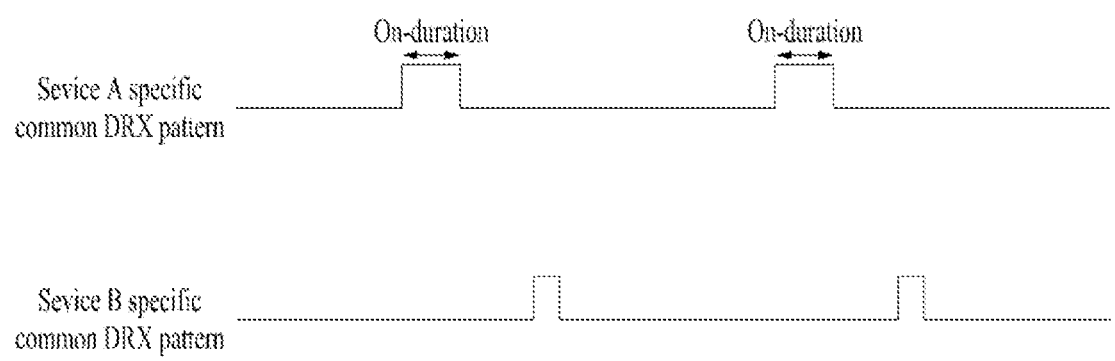

According to an embodiment, the second UE may enter a sleep state (S1301 of FIG. 13) and may then transition to an awake state to receive a broadcast signal from a first UE for a predetermined period (S1302 of FIG. 13). Here, the broadcast signal may be received on a dedicated resource pool for sidelink broadcast.

That is, the dedicated resource pool for sidelink broadcast may be configured for sidelink broadcast, and a sidelink broadcast signal may be transmitted using at least a portion of the dedicated resource pool for sidelink broadcast. The dedicated resource pool for sidelink broadcast may be referred to as a dedicated pool for sidelink broadcast, a dedicated DRX/broadcast resource pool, or the like, may not be constrained by a name thereof, and a resource pool used exclusively for broadcast in sidelink DRX may correspond to this.

As such, when a DRX operation is performed using a dedicated resource pool for broadcast, it may be possible to transmit/receive a broadcast message without an operation of a timer for DRX in the corresponding resource pool. Alternatively, in order to transmit/receive a broadcast message even before configuration of mutual DRX patterns (even without special configuration), the TX/RX UE may be capable of transmitting/receiving the broadcast message in a corresponding pool.

A BS may allocate a dedicated pool for sidelink broadcast in advance and may broadcast a message only in a corresponding pool even during a DRX operation. The broadcast dedicated pool may be configured differently for respective cells. When a transmitting UE requests a broadcast resource from the BS, the BS may allocate the resource to a predetermined broadcast dedicated pool.

The configuration for the sidelink broadcast transmission pool configured for transmission may be informed to the transmitting/receiving UE through DCI. Alternatively, information related to the dedicated resource pool for sidelink broadcast may be transmitted to sidelink UEs via RRC signaling.

The predetermined period may be determined by a BS that receives a broadcast resource request of the first UE based on one or more of a Message type, Required coverage, Required latency, service characteristics, a geographical area, Group ID(s), and triggering indication. The broadcast resource request may include one or more of information corresponding to the message request, that is, a Message type, Required coverage, Required latency, service characteristics, a geographical area, Group ID(s), and triggering indication.

The predetermined period may be for a UE having a common sidelink DRX configuration with the second UE. The predetermined period may be different from a period configured for a UE that does not have the common sidelink DRX configuration with the second UE. The common sidelink DRX configuration may be different according to at least one of a service, a geographical-area, a zone ID, or a group ID. A detailed description in this regard will be provided later.

In terms of an apparatus for performing the above-described methods, the second UE may include at least one processor, and at least one computer memory operatively connected to the at least one processor and configured to store commands for causing the at least one processor to perform operations when being executed, and here, the operations may include entering a sleep state, and transitioning to an awake state and receiving a broadcast signal from a first UE in a predetermined period, and the broadcast signal may be received on a dedicated resource pool for sidelink broadcast.

With regard to the aforementioned method, in terms of a processor for performing operations for a second UE, the operations may include entering a sleep state, and transitioning to an awake state and receiving a broadcast signal from a first UE in a predetermined period. Here, the broadcast signal may be received on a dedicated resource pool for sidelink broadcast.

A non-volatile computer readable storage medium for storing at least one computer program including a command for causing at least one processor to perform operations for a second UE when being executed by the at least one processor may include entering a sleep state, and transitioning to an awake state and receiving a broadcast signal from a first UE in a predetermined period, and the broadcast signal may be received on a dedicated resource pool for sidelink broadcast.

In order to receive a broadcast message, a reception DRX UE may also configure an on-duration thereof in a broadcast dedicated pool. As described above, the reception DRX UE (the second UE) may wake up to receive a broadcast message in an on-duration to be described below, which will be described below in detail. Hereinafter, the 'resource for sidelink broadcast' may be (sidelink) on-duration corresponding to the predetermined period when the resource pool exclusively configured for broadcast is used. When the resource pool exclusively configured for broadcast is not used, the 'resource for sidelink broadcast' may include both a time axis resource area and a frequency axis resource area. Hereinafter, the transmitting UE1 may be the first UE or UE1 of FIG. 12, and the receiving UE2 may be the second UE or UE2 of FIG. 12.

Figure 15:
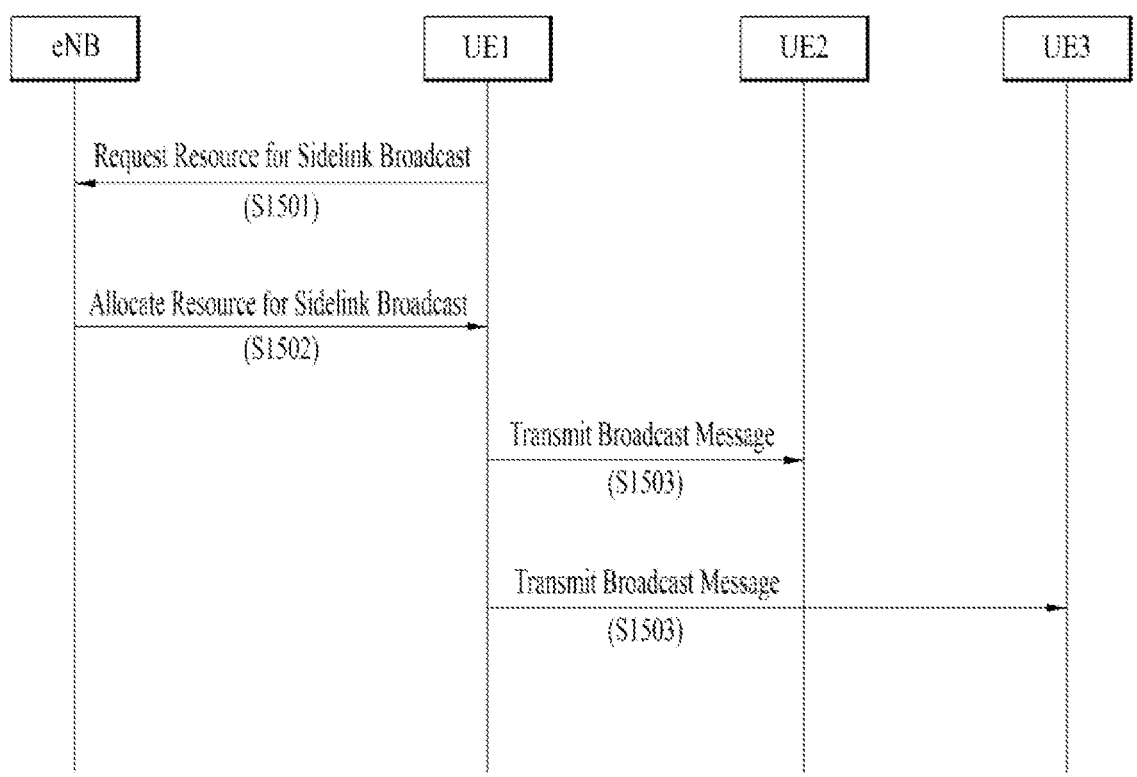

An object of the method described below may be to broadcast a message to UEs having different common sidelink on-duration patterns by a UE that intends to a broadcast message. The sidelink DRX configuration may use a predetermined value according to a service/geographical-area/zone-ID/group-ID, etc. or a value configured from a BS. UEs may have different on-duration patterns, but there may be a common sidelink on-duration pattern according to a service/geographical-area/zone-ID/group-ID, etc. For example, a common on-duration pattern used in a service A and a common on-duration pattern used in a service B may be different as shown in FIG. 15. That is, it may be assumed that UEs using the service A wake up during on-duration of a specific common DRX pattern of the service A and that UEs using the service B wake up during on-duration of a specific common DRX pattern of the service B. An object of embodiment(s) may be to broadcast a message to UEs having different common sidelink on-durations for respective services/geographical-areas/zone-IDs/group-IDs.

FIG. 15 is a flowchart related to a method of transmitting a broadcast message in a sidelink DRX mode, which is for the case of in-coverage.

Referring to FIG. 15, in operation S1501, when there is a message to be broadcast via sidelink, a transmitting UE1 may request a resource for sidelink broadcast through Uu link. In this case, the characteristics of the message to be broadcast may be transferred to a BS, and thus the BS may refer to the characteristics of the message when allocating resources. The characteristics of the message transferred to the BS may include at least one of a Message type, Required coverage, Required latency, service characteristics, geographical area, Group ID(s), or triggering indication. That is, the predetermined period may be determined by a BS that receives a broadcast resource request of the first UE based on one or more of a Message type, Required coverage, Required latency, service characteristics, geographical area, Group ID(s), and triggering indication. The broadcast resource request may include one or more of information corresponding to the message request, that is, a Message type, Required coverage, Required latency, service characteristics, geographical area, Group ID(s), and triggering indication.

In more detail, the Message type/cast type may be for notifying the BS that a connectionless (or connection) broadcast message is to be transferred, and for being allocated a suitable resource. The Required coverage may be a value that applies the characteristics of a message to be broadcast and indicates whether it is suitable to be transferred to other UEs present in a coverage based on the transmitting UE. According to the Required coverage value, a resource in consideration of the interference level may be allocated. The Required latency may be a value indicating latency requirement/delay budget in which a message to be broadcast is transferred as a valid value.

Continuously, service characteristics (or ID) (to be transferred) may indicate whether a UE using any service is a target UE in order to transfer the message to be broadcast only to UEs using a specific service. The BS receiving the corresponding information may know the common sidelink on-duration pattern for each service (or reconfigured by the BS), and thus a resource for broadcast may be allocated with reference to the common sidelink on-duration pattern. The specific geographical area (or zone ID) (to be transferred) may be for notifying the BS of a geographical area (or zone ID) to which the message is to be desired to be broadcast in order to transfer the message to be broadcast to a UE present in a specific region. The BS may know a common sidelink on-duration pattern for each specific geographical area (or zone ID), and thus may allocate a resource for broadcast with reference to the common sidelink on-duration pattern. The Group ID(s) may be for notifying the BS of specific Group ID(s) to be broadcast in order to broadcast a message to be broadcast only to a UE corresponding to the specific group ID(s). The BS may know a common sidelink on-duration pattern for each specific Group ID, and thus may allocate a resource for broadcast with reference to the common sidelink on-duration pattern. The triggering indication may indicate that a requested resource is resource allocation required for broadcast in consideration of a neighbor UE operating in a sidelink DRX mode.

Continuously, in operation S1502, the BS may allocate a resource for sidelink broadcast to the transmitting UE1 in consideration of a common sidelink DRX configuration/pattern of receiving UEs that needs to receive a broadcast message of the transmitting UE1 according to the characteristics of a message to be broadcast by the transmitting UE1. In this case, a common sidelink DRX pattern of receiving UEs may be different according to a used service/position (geographical-area, zone ID)/group ID, and thus the transmitting UE1 may be allocated multiple resources within a delay budget of a packet as a sidelink resource for broadcast.

In operation S1503, the transmitting UE1 allocated the resource for sidelink broadcast from the BS may broadcast the same broadcast message multiple times on the allocated resource. The broadcast resource allocated by the BS to the transmitting UE may indicate the position of a resource that neighbor receiving UEs having different common sidelink on-duration DRX patterns are capable of receiving within a delay budget of a packet, and may indicate the position at which a broadcast message is capable of being received at least once. When the BS allocates resources for broadcast for sidelink at a request of the transmitting UE, the information received in operation S1501 may be referred to.

For example, when transmitting UE1 broadcasts a message to a DRX operating UE at a specific geographical position, the transmitting UE1 may need to indicate to request a broadcast resource for a target geographical position and a DRX UE present at the corresponding position. UEs having common on-duration periods with multiple different patterns may be present at the corresponding geographical position (e.g., three services may be used at a specific position, and common on-duration periods for respective services may be different), and the BS requested for this may allocate positions for reception of all UEs (as many UEs as possible) to the transmitting UE1 through the resource for sidelink broadcast according to common sidelink DRX on-duration periods of UEs present at the target geographical position. Receiving UE(s) having different common on-duration periods as DRX configuration may be a target, and thus there may be one or more resources allocated for broadcast by the BS, and in this case, the transmitting UE1 may broadcast the same resource to the corresponding resource.

In another example, an environment in which different common sidelink on-durations are used for respective zone IDs may be assumed. In order to broadcast a message to UEs in some zone ID areas, common sidelink on-durations for respective UEs may be different according to a zone-ID. The transmitting UE may notify the BS of target zone-IDs of a region as a broadcast target, and the BS may allocate resources for broadcast to common on-duration periods for respective corresponding zone-IDs. The common on-duration periods for the respective Zone-IDs may be different, and thus when there are multiple target zone-IDs, there may be multiple places to which resources for broadcast are allocated. The receiving UE allocated the broadcast resource may broadcast the same message to a corresponding resource, and in this case, it may be possible to broadcast a message to UEs positioned in desired zone-IDs.

Figure 16:
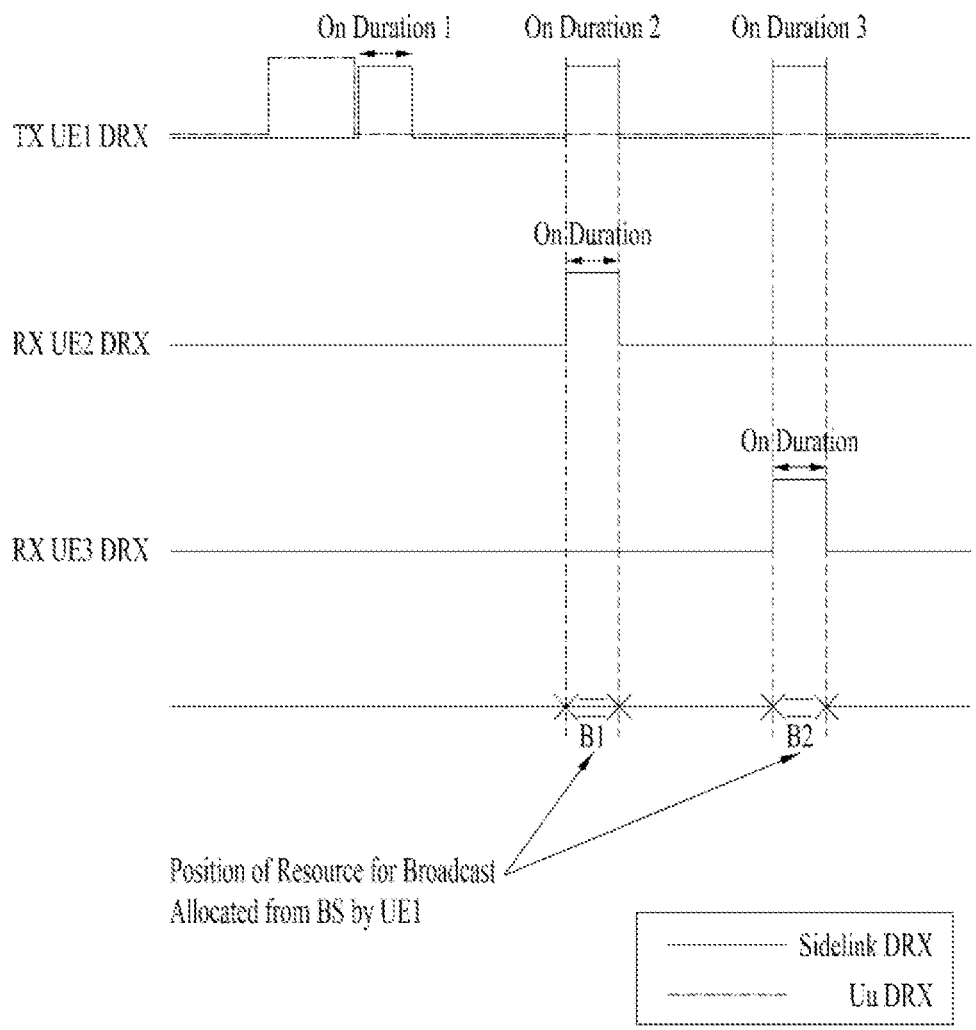

FIG. 16 is a diagram showing an example based on the above description. A UE1 is a TX UE, a UE2 and a UE3 are an RX UE, and it is assumed that the UEs operate with different common DRX configurations.

Referring to FIG. 16, when a TX UE1 requests a broadcast resource for sidelink DRX (during on-duration of Uu DRX) through Uu link, a BS may allocate the broadcast resource to the TX UE1 according to a common on-duration position of neighbour RX UEs. The position of the allocated resource may be a resource corresponding to a on-duration period of RX UE 2 and UE3, and may be a resource corresponding to B1 and B2 in the drawing.

The TX UE1 allocated a corresponding resource at times B1 and B2 may transmit the same broadcast resource to a corresponding resource, and the RX UE2 and UE3 may receive this. Alternatively, the TX UE1 allocated a corresponding resource at times B1 and B2 may transmit the same broadcast signal through/using the corresponding resource, and the RX UE2 and UE3 may receive this. The positions of resources B1 and B2 need to be a value belonging to a latency budget of a packet as a transmission target, and the BS may not allocate a broadcast resource to a position beyond the latency budget.

In the above description, when the BS allocates a resource (grant) for broadcast/groupcast to a TX UE, if a resource pool pre-allocated for RX UEs operating DRX to receive a sidelink broadcast message is present, the resource (grant) may be (preferentially) allocated to a corresponding position (resource pool).

Figure 17:
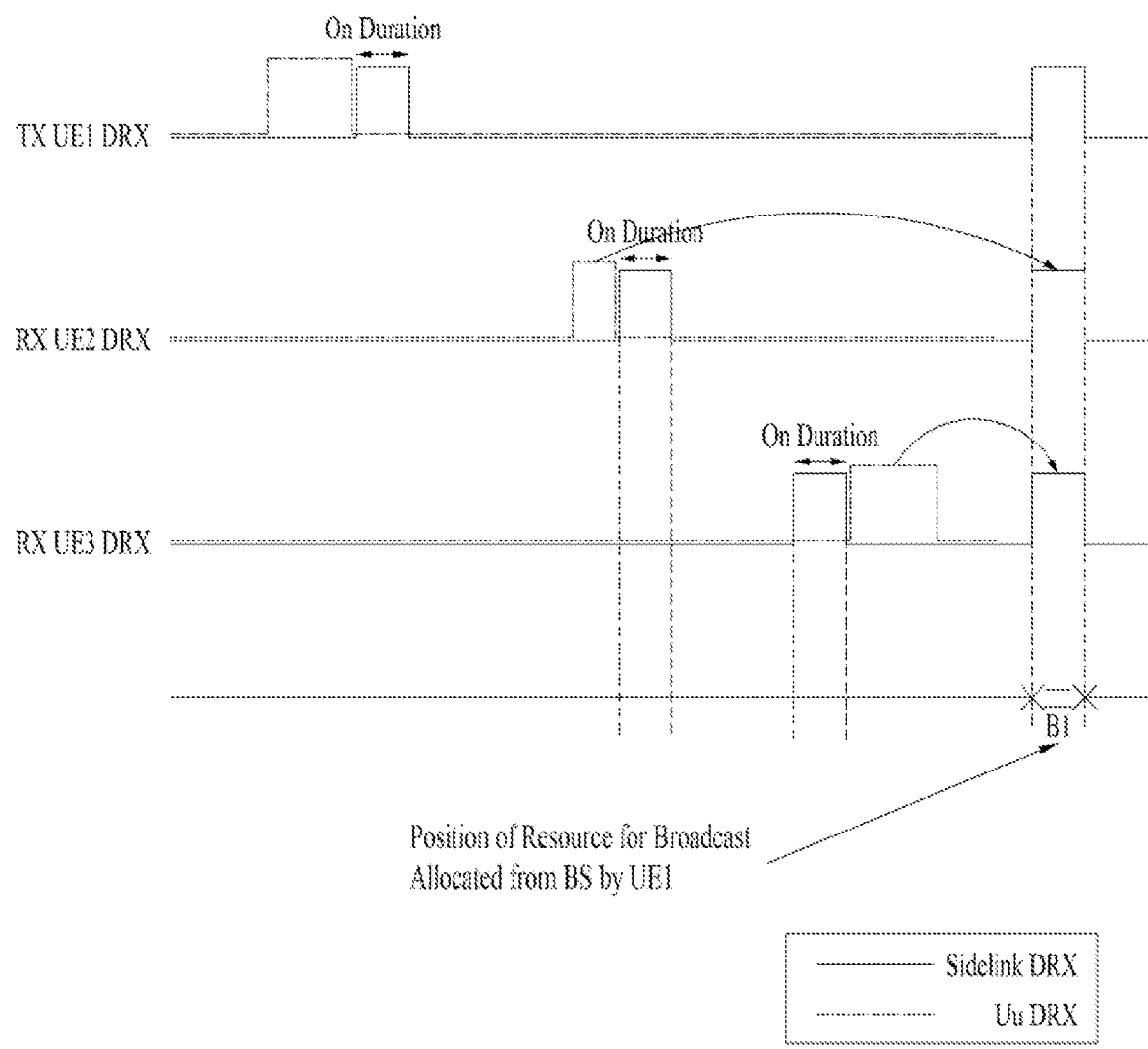

Hereinafter, with reference to FIG. 17, a method of acquiring information on the predetermined period through DCI receive during Uu on-duration by each UE and receiving a broadcast message in the predetermined period will be described.

When there is a message to be broadcast through sidelink, the transmitting UE1 may request a resource for sidelink broadcast through Uu link. A detailed description in this regard will be understood with reference to operation S1501 described above.

The predetermined period may be determined by the BS based on one or more of latency requirement, delay budget, and Uu DRX on-duration of UEs receiving the broadcast signal. That is, the BS may allocate a resource for sidelink broadcast in consideration of one or more of the following factors.

Latency requirement or delay budget of packet to be broadcast: A resource for broadcast needs to be allocated within latency requirement/delay budget.

Uu-DRX configuration of Target UE(s): This may indicate a resource position or on-duration period for receiving a sidelink broadcast message during on-duration of Uu-DRX.

An allocated resource position may be informed through DCI. That is, a BS may inform target UE(s) of a resource position for receiving a broadcast message through an on-duration period of Uu-DRX. The target UE(s) receiving this may configure on-duration at a corresponding position and may receive a broadcast message. In this case, the BS may pre-inform information such as an ID/group ID/geographical position of a UE as a broadcast target, and the target UE(s) may determine whether to match on-duration to the broadcast resource position with reference to the corresponding information.

The TX UE1 may request allocation of a resource for sidelink broadcast according to a Uu-DRX period of the TX UE1. A BS requested to allocate the resource for sidelink broadcast may allocate the resource for sidelink broadcast in consideration of Uu-DRX configuration of RX UE2 and UE3 to which a message is to be broadcast and latency requirement (delay budget) of a broadcast message. The resource position for sidelink broadcast may be informed through a signal such as DCI during on-duration of Uu-DRX of the RX UE2 and UE3, and thus when the BS allocates the sidelink broadcast resource, the resource for sidelink broadcast may be allocated after Uu-DRX on-duration of at least one period (e.g., slot). As shown in the drawing, a resource may be allocated after the on-duration period of Uu-DRX of RX UE(s) (e.g., specific group ID, zone ID, geographical area, and specific service) that is supposed to a broadcast message (B1 of the drawing), and information thereon may be indicated during Uu-DRX on-duration before the allocated resource. The RX UE(s) that are instructed on the position at which sidelink broadcast is to be received through Uu-DRX may receive the sidelink broadcast message by configuring a corresponding period to on-duration, not in the preconfigured sidelink DRX configuration.

As described above, when a BS allocates a resource (grant) for broadcast/groupcast to a TX UE, if a preconfigured resource pool for transmitting the sidelink DRX broadcast message is present, the BS may (preferentially) allocate the resource (grant) within the corresponding resource pool.

Needless to say, the above description may be applied similarly to the case of broadcast and groupcast operations.

According to the proposal, it may be assumed that the BS knows sidelink configuration of all UEs present within coverage. When a sidelink DRX operation is performed within in-coverage based on the sidelink DRX configuration, the BS needs to manage configuration for sidelink DRX or to know at least the sidelink configuration. In this case, the sidelink DRX may or may not be a part of the Uu DRX configuration (i.e., when the on-duration periods of patterns match). In any case, when the BS does not configure sidelink DRX to manage the configuration for sidelink DRX (i.e., when the UE itself configures the sidelink DRX), the corresponding configuration and an ID (layer2 ID) of the BS need to be reported to the BS through an uplink channel (PUCCH).

Alternatively, the BS may pre-allocate a dedicated pool for sidelink broadcast and may broadcast a message only in a corresponding pool even during a DRX operation. The broadcast dedicated pool may be differently configured for each cell. When the transmitting UE requests for a resource for broadcast to the BS, the BS may allocate the resource to a predetermined broadcast dedicated pool. When the reception DRX UE intends to receive the broadcast message, the reception DRX UE may configure on-duration thereof to the broadcast dedicated pool. The configuration for the sidelink broadcast transmission pool configured for transmission may be informed to the transmitting/receiving UE through DCI.

In the above description, a method for sidelink broadcast within in-coverage has been proposed. Hereinafter, a method of transmitting a broadcast message in a sidelink DRX mode in the case of out-coverage will be described.

In out-coverage, it may not be easy to mutually discover UEs operating sidelink DRX. To this end, a discovery message including a DRX configuration (pattern) of the UE may be periodically transmitted. In this case, the position of a resource pool to be used for broadcast by the UE within the DRX configuration (pattern) may be indicated. The position of the resource pool to be used for broadcast may coincide with the DRX on-duration of the UE but may not coincide therewith. When it does not coincide with the DRX on-duration, the UE may wake up to broadcast a message in a corresponding period.

A resource used for sidelink broadcast may be a (pre) configured resource. A UE performing a special function (e.g., a RSU, a vehicle, or a personal mobile), a UE at a specific position (e.g., a geographical area or a zone ID), and a UE performing a specific service (e.g., public safety) may have a resource pool for fixed (predetermined) broadcast according to a specific group ID, which may be predetermined resource pool configuration. The preconfigured resource pool configuration may be transmitted through a discovery message or SCI.

For example, this may be information obtained by detecting a resource pool to be used for broadcast from a discovery message of a UE1 at a specific position in which the UE1 is interested or (pre-)configuring a broadcast resource position with respect to a corresponding position in order to receive information to be broadcast by the UE1. When a position at which the UE1 broadcasts the message is recognized, desired information may be received by including the corresponding resource position in an on-duration period.

A method related to FIG. 16 among the aforementioned broadcast methods used in in-coverage may also be used in out-coverage. However, in the case of in-coverage described above, when the transmitting UE requests for target characteristics (service, geographical-area, zone-ID, and group-ID) of a message to be broadcast and a broadcast resource therefor to the BS, the BS may allocate a resource for broadcast to a common sidelink DRX on-duration period, but in the case of out-coverage, the BS may not be involved, and thus a position to which the message is to be broadcast may be found using the pre-configured information. For example, when the pre-configured information is configured with a common sidelink DRX on-duration period for each of a service, a geographical-area, a zone-ID, and a group-ID, the transmitting UE may broadcast the same message multiple times within a delay budget in a common sidelink DRX on-duration period that is different for each of a service, a geographical-area, a zone-ID, and a group-ID according to a transmission purpose of the message. The receiving UE(s) may select a resource and may receive a broadcast message in a common sidelink DRX on-duration period that is currently used by the receiving UE(s).

In the above description, the exemplified group ID may be a groupcase/broadcast destination layer2 ID used in an AS layer associated (mapped) with a specific groupcast/broadcast service (or service ID: e.g., PSID).

According to an embodiment, a method of transmitting a broadcast message in a sidelink DRX operation has been described. In the in-coverage operation, a method in which a resource for sidelink broadcast is allocated to a common sidelink DRX on-duration positioned for each of target characteristics (service, geographical-area, zone-ID, or group-ID) with assistance of a BS and broadcasting a message within a delay budget is proposed, and in the out-of-coverage operation, a method in which a resource position for broadcast is shared using a discovery message, a sidelink broadcast message is transmitted in a DRX environment using a (pre-)configured broadcast dedicated pool, or a message is broadcast to a common sidelink DRX on-duration position is proposed.

Although an example of a method of transmitting a broadcast message in a DRX environment has been described according to an embodiment, the method proposed according to an embodiment may also be applied to groupcast or unicast, needless to say.

Examples of communication systems applicable to the present disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
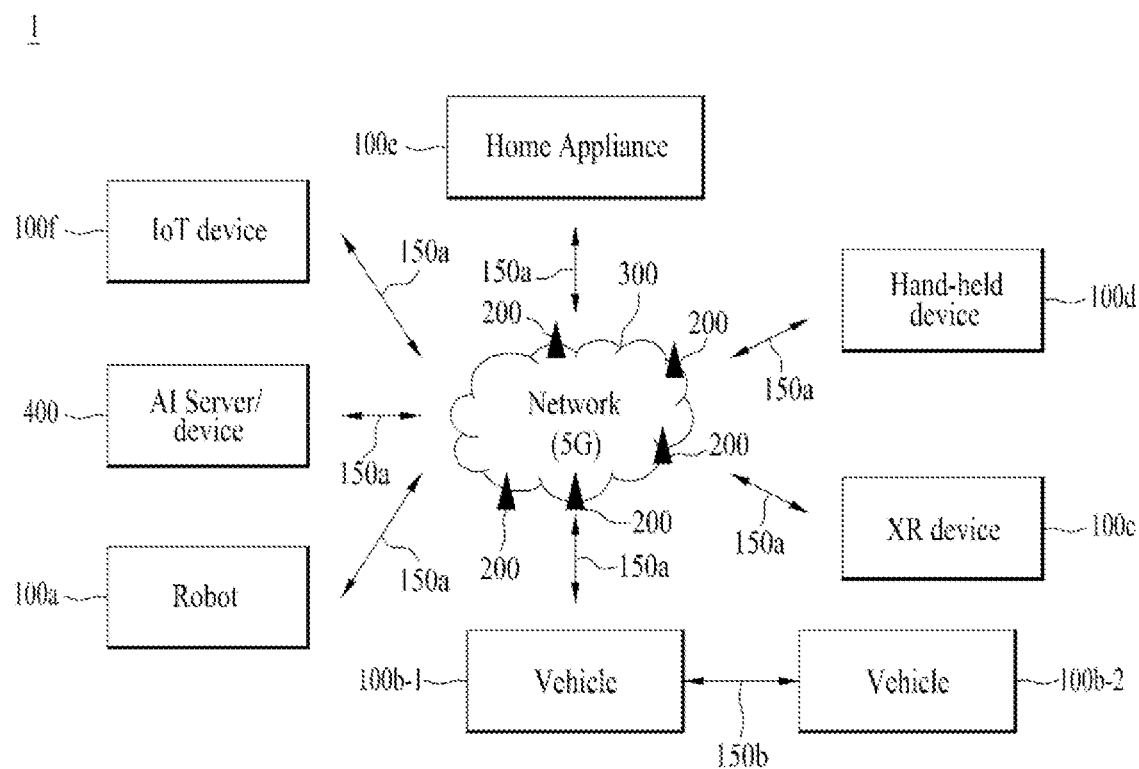
FIGS. 18 to 24 are diagrams for explaining various apparatuses to which embodiment(s) are applicable.

FIG. 18 illustrates a communication system 1 applied to the present disclosure.

Referring to FIG. 18, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100*a*, vehicles 100*b*-1 and 100*b*-2, an extended reality (XR) device 100*c*, a hand-held device 100*d*, a home appliance 100*e*, an Internet of things (IoT) device 100*f*, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of wireless devices applicable to the present disclosure

Figure 19:
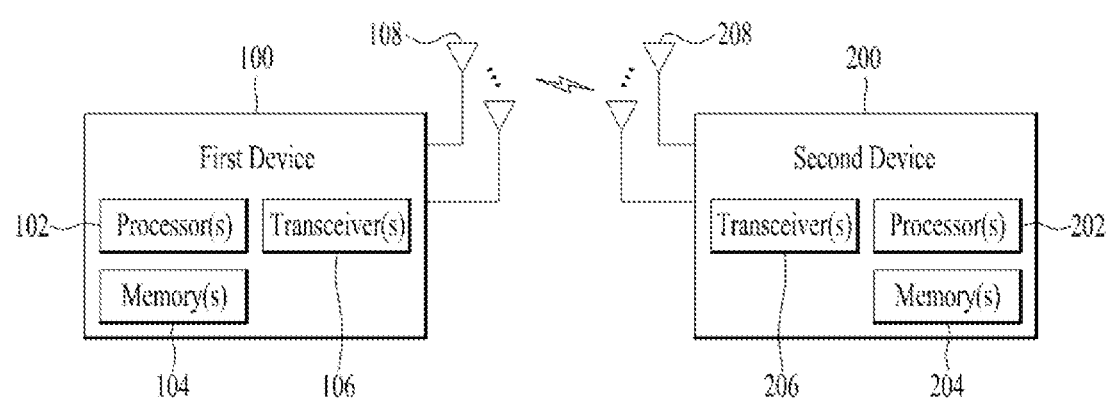

FIG. 19 illustrates wireless devices applicable to the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
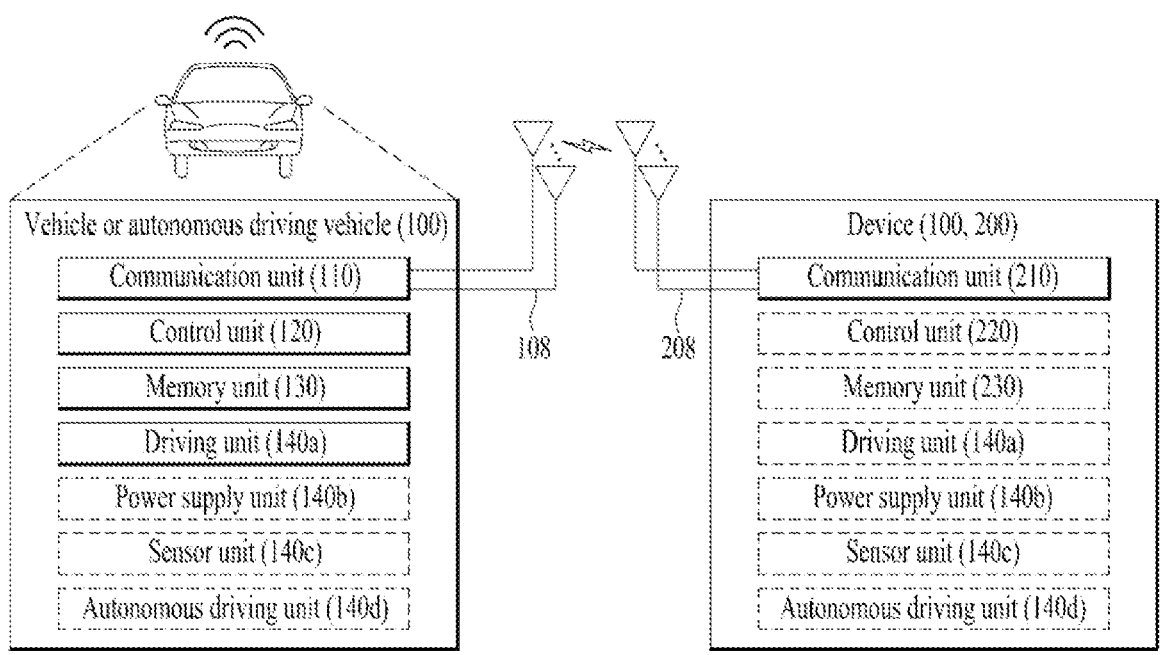

Examples of a vehicle or an autonomous driving vehicle applicable to the present disclosure FIG. 20 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 20, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 43, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a vehicle and AR/VR applicable to the present disclosure

Figure 21:
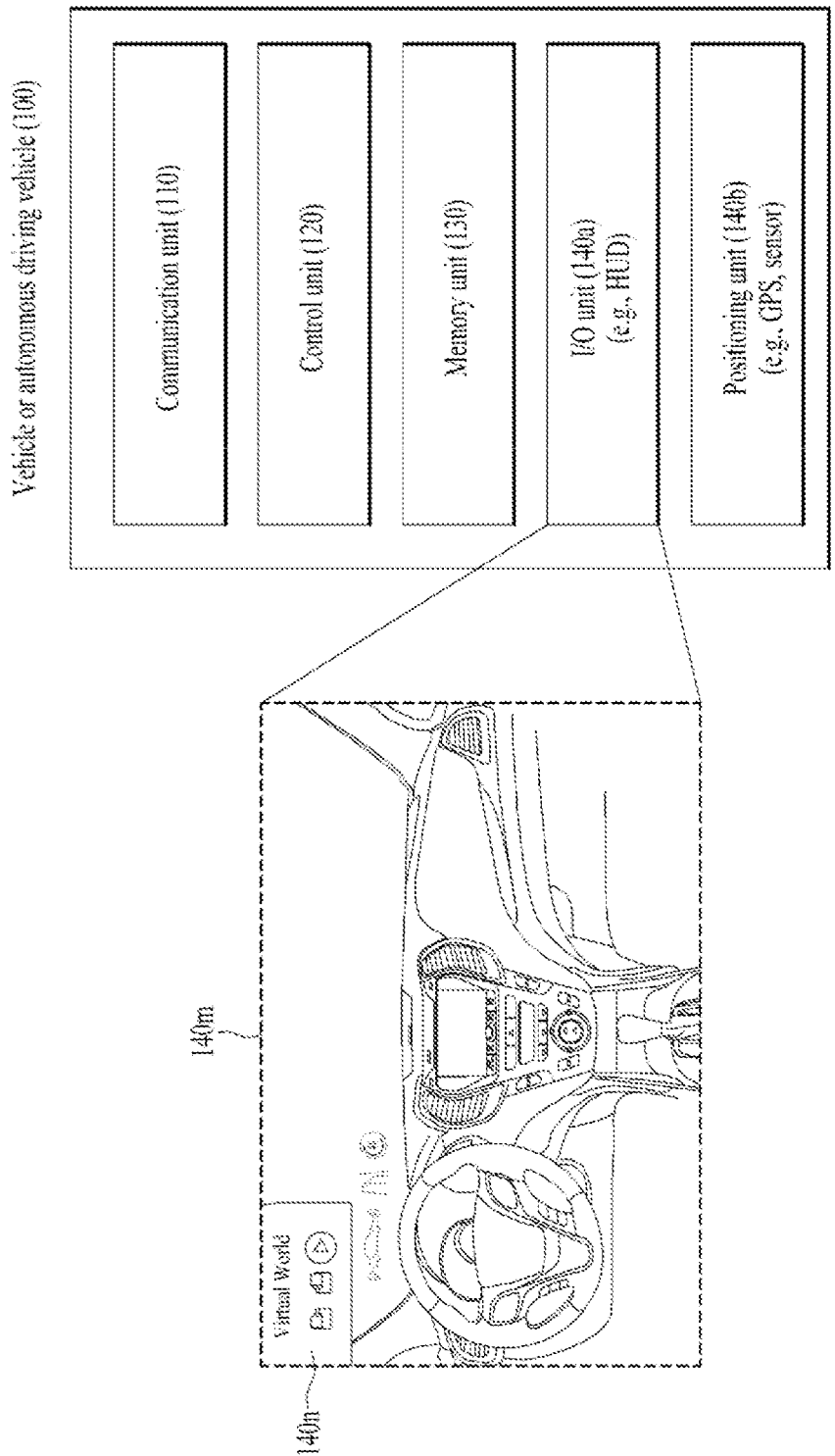

FIG. 21 illustrates a vehicle applied to the present disclosure. The vehicle may be implemented as a transport means, an aerial vehicle, a ship, etc.

Referring to FIG. 21, a vehicle 100 may include a communication unit 110, a control unit 120, a memory unit 130, an I/O unit 140*a*, and a positioning unit 140*b*. Herein, the blocks 110 to 130/140*a* and 140*b* correspond to blocks 110 to 130/140 of FIG. 43.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140*a* may output an AR/VR object based on information within the memory unit 130. The I/O unit 140*a* may include an HUD. The positioning unit 140*b* may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR device applicable to the present disclosure

Figure 22:
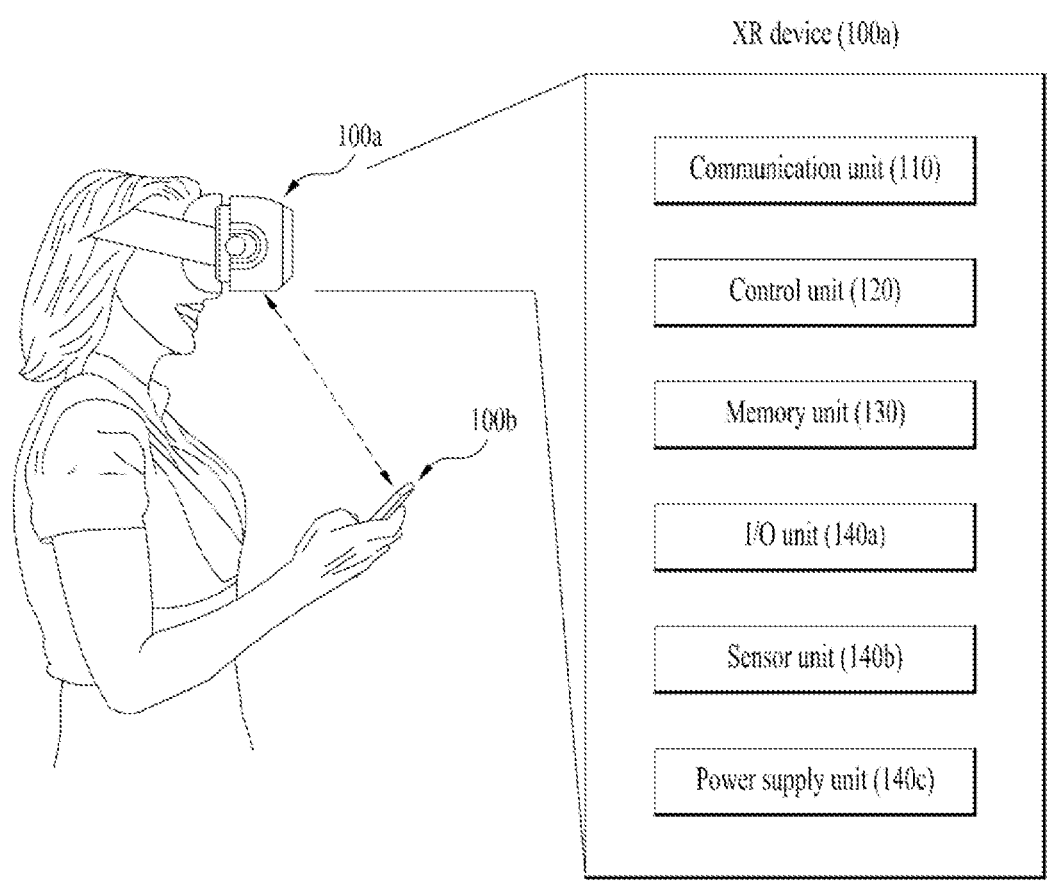

FIG. 22 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 22, an XR device 100*a* may include a communication unit 110, a control unit 120, a memory unit 130, an I/O unit 140*a*, a sensor unit 140*b*, and a power supply unit 140*c*. Herein, the blocks 110 to 130/140*a* to 140*c* correspond to the blocks 110 to 130/140 of FIG. 43, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100b and generate and output an XR object corresponding to the hand-held device 100b.

Examples of a robot applicable to the present disclosure

Figure 23:
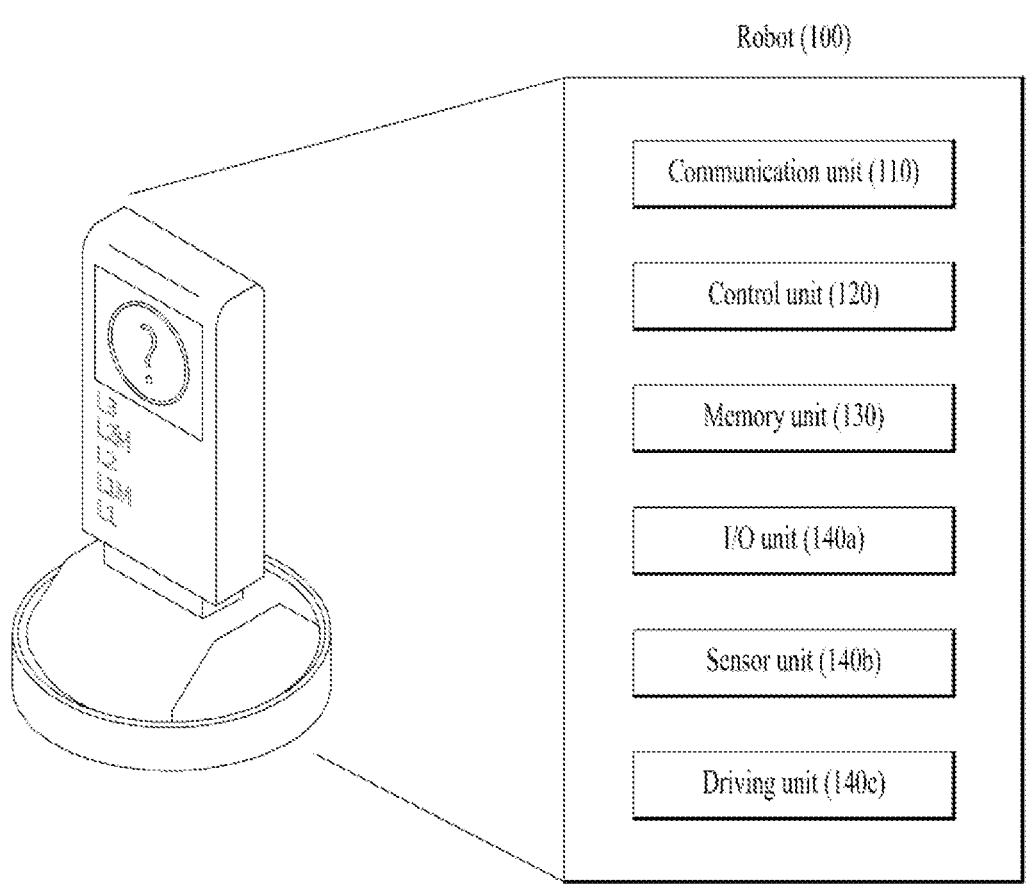

FIG. 23 illustrates a robot applied to the present disclosure. The robot may be categorized into an industrial robot, a medical robot, a household robot, a military robot, etc., according to a used purpose or field.

Referring to FIG. 23, a robot 100 may include a communication unit 110, a control unit 120, a memory unit 130, an I/O unit 140a, a sensor unit 140b, and a driving unit 140c. Herein, the blocks 110 to 130/140a to 140c correspond to the blocks 110 to 130/140 of FIG. 19, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Example of AI device to which the present disclosure is applied.

Figure 24:
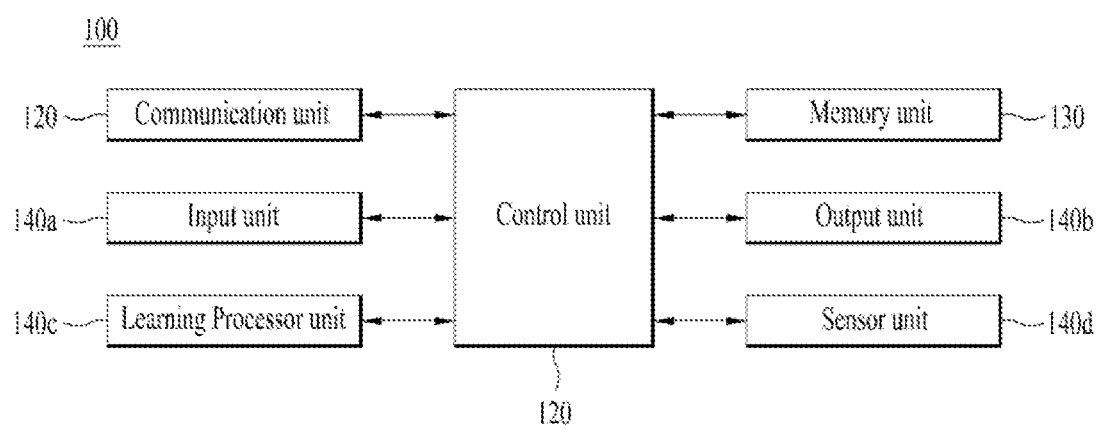

FIG. 24 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 24, an AI device 100 may include a communication unit 110, a control unit 120, a memory unit 130, an I/O unit 140a/140b, a learning processor unit 140c, and a sensor unit 140d. The blocks 110 to 130/140a to 140d correspond to blocks 110 to 130/140 of FIG. 19, respectively.

The communication unit 110 may transmit and receive wired/radio signals (e.g., sensor information, user input, learning models, or control signals) to and from external devices such as other AI devices (e.g., 100x, 200, or 400 of FIG. 18) or an AI server (e.g., 400 of FIG. 18) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 18). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 18). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

INDUSTRIAL AVAILABILITY

The above-described embodiments of the present disclosure are applicable to various mobile communication systems.

What is claimed is:

1. A UE to UE direct communication discontinuous reception (DRX)-related operation method of a second user equipment (UE) in a wireless communication system, the method comprising:
   entering, by the second UE, a sleep state;
   transitioning, by the second UE, to an awake state; and
   receiving a broadcast signal from a first UE during an on duration,
   wherein the broadcast signal is received on a dedicated resource pool for UE to UE direct communication broadcast, wherein a plurality of UEs in a geographical area in which the second UE is located has a plurality of on durations configured per specific services, and wherein the dedicated resource pool includes a common duration of the plurality of on durations configured per specific services.

2. The method of claim 1, wherein the on duration is determined by the BS that receives a broadcast resource request of the first UE.

3. The method of claim 2, wherein the broadcast resource request includes one or more of a Message type, a Required coverage, a Required latency, a service characteristic, a geographical area, a Group ID(s), or a triggering indication.

4. The method of claim 1, wherein the on duration is indicated by DCI received during on-duration related to a BS by the second UE.

5. The method of claim 4, wherein the on duration is determined by the BS based on one or more of latency requirement, delay budget, and Uu DRX on-duration of UEs that receive the broadcast signal.

6. The method of claim 4, wherein on-duration related to the BS is on-duration of Uu DRX.

7. The method of claim 1, wherein the dedicated resource pool for the UE to UE direct communication broadcast is differently configured for each cell.

8. A second user equipment (UE) in a wireless communication system, comprising:
at least one processor; and
at least one computer memory operatively connected to the at least one processor and configured to store commands for causing the at least one processor to perform operations when being executed,
wherein the operations includes:
entering a sleep state;
transitioning to an awake state; and
receiving a broadcast signal from a first UE during an on duration,
wherein the broadcast signal is received on a dedicated resource pool for UE to UE direct communication broadcast,
wherein a plurality of UEs in a geographical area in which the second UE is located has a plurality of on durations configured per specific services, and
wherein the dedicated resource pool includes a common duration of the plurality of on durations configured per specific services.

9. A processor for performing operations for a second user equipment (UE) in a wireless communication system, the operations comprising:
entering a sleep state;
transitioning to an awake state; and
receiving a broadcast signal from a first UE during an on duration,
wherein the broadcast signal is received on a dedicated resource pool for UE to UE direct communication broadcast,
wherein a plurality of UEs in a geographical area in which the second UE is located has a plurality of on durations configured per specific services, and
wherein the dedicated resource pool includes a common duration of the plurality of on durations configured per specific services.

10. A non-transitory computer readable storage medium for storing at least one computer program including a command for causing at least one processor to perform operations for a second user equipment (UE) when being executed by the at least one processor, the operations comprising:
entering a sleep state; and
transitioning to an awake state; and
receiving a broadcast signal from a first UE during an on duration,
wherein the broadcast signal is received on a dedicated resource pool for UE to UE direct communication broadcast,
wherein a plurality of UEs in a geographical area in which the second UE is located has a plurality of on durations configured per specific services, and
wherein the dedicated resource pool includes a common duration of the plurality of on durations configured per specific services.

* * * * *